UNITED STATES PATENT OFFICE.

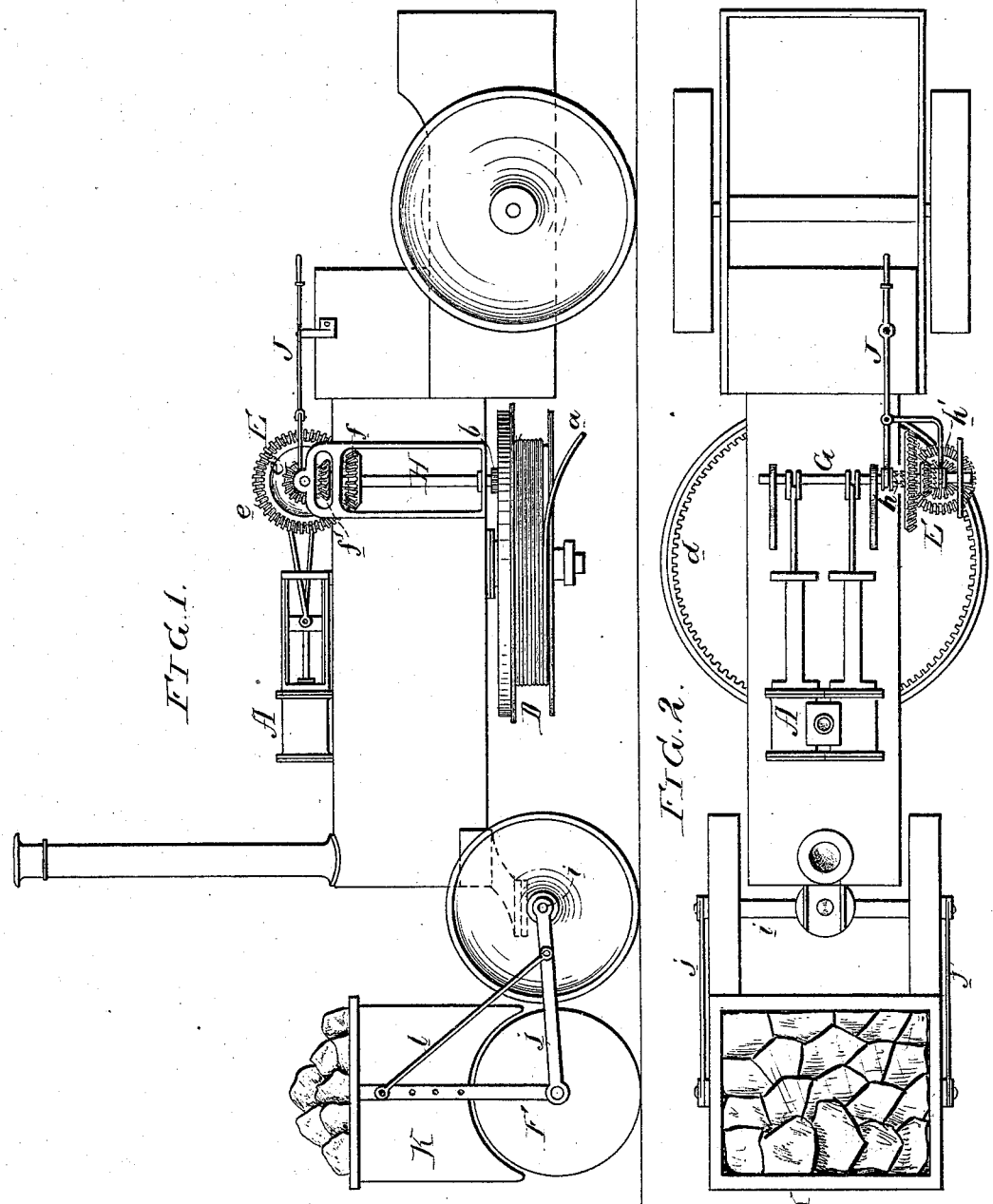

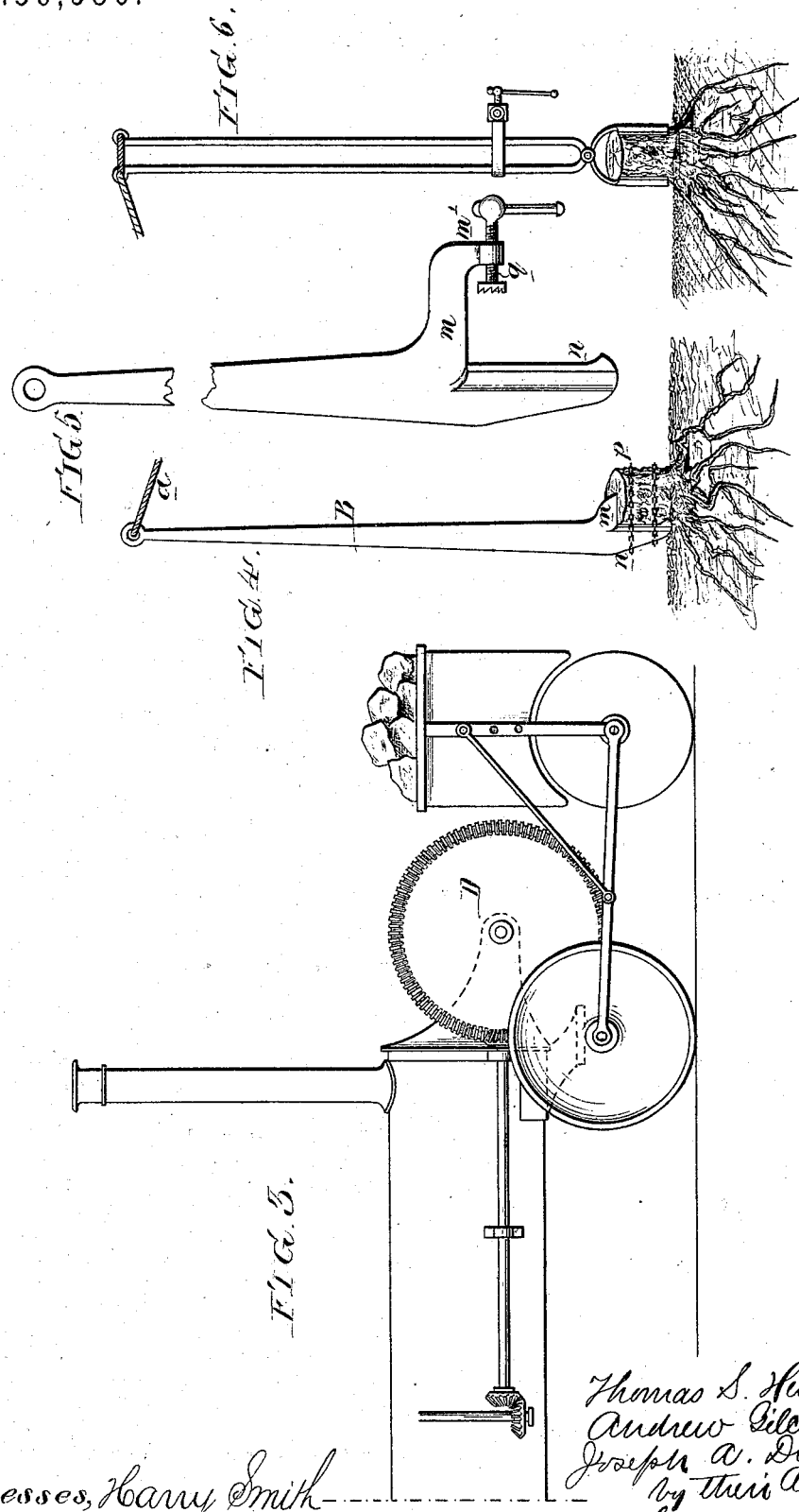

THOMAS S. HUNTLEY, OF CARDIFF, WALES, ANDREW GILCHRIST, OF ANSTRUTHER, AND JOSEPH A. DIXON, OF GLASGOW, NORTH BRITAIN.

IMPROVEMENT IN MACHINES FOR EXTRACTING STUMPS.

Specification forming part of Letters Patent No. 150,580, dated May 5, 1874; application filed March 2, 1874.

*To all whom it may concern:*

Be it known that we, THOMAS S. HUNTLEY, of Cardiff, in the county of Glamorgan, Wales, ANDREW GILCHRIST, of Anstruther, in the county of Fife, North Britain, and JOSEPH A. DIXON, of Glasgow, in the county of Lanark, North Britain, have invented certain Improvements in Stump-Extracting Mechanism, of which the following is a specification:

The object of our invention is to extract trees and tree-stumps from the ground, in order to clear the soil and render it fit for cultivation, and we attain this object by the use of the portable steam-engine A, shown in the side elevation, Fig. 1, Sheet 1, of the accompanying drawings; and the extracting-implement B, shown in Fig. 4, Sheet 2, the latter after having been attached to a stump being operated by a rope or chain, $a$, connected to the hauling-drum D of the engine, to which a fast or slow movement can be imparted by differential driving-gear E. The engine is also provided in front with a weighted roll, F, for rolling down snow and other obstructions to its free locomotion.

In the drawing, we have shown no more of the engine than is necessary to illustrate our improvements; but it may be well to state in the outset that we propose in most cases to use a self-propelling engine, provided with such traction and reversing gear as we shall find most suitable for the purpose.

In the elevation, Fig. 1, and plan view, Fig. 2, the winding-drum D is situated below the boiler, and is operated from the crank-shaft G of the engine through the medium of bevel-gear E, and a vertical shaft, H, which has a toothed pinion, $b$, at its lower end, gearing into cog-teeth $d$ on the upper face of the drum. The gear above referred to consists of two bevel-pinions, $e$ and $e'$, keyed to the shaft H, and gearing into a bevel-wheel, $f$, and bevel-pinion $f'$, both loose on the crank-shaft G. Two clutches, $h$ and $h'$, which slide upon, without turning independently of, the said crank-shaft, adjoin the bevel-wheel and pinion, and are arranged to be operated simultaneously by a clutch-lever, J, in such a manner as to throw the wheel into gear with the shaft simultaneously with the disengagement of the pinion, and vice versa. By means of this gearing, a quick or slow rotation of the winding-drum D can be produced at pleasure. The leveling-roller F, which precedes the engine for the purpose of rolling down snow, uneven ground, and other obstructions which would interfere with the free locomotion of the said engine, is attached to the front axle $i$ of the latter by links $j$, and may be weighted by filling it with water or solid material, or by arranging directly above it a box, K, to be filled with stones or pig-iron, the said box being maintained in proper position by suitable framework $l$ secured to the links $j$.

In operating the engine for uprooting trees, the end of the chain, or wire, or other rope $a$, attached to the drum D, is connected to the tree at a considerable height above the ground, so that the stem of the tree shall become a lever to which the power of the engine is applied for uprooting it. The rope $a$ may be attached directly to a chain-sling encircling the tree, or it may be passed around an anchor or snatch-block at any angle required, and when so attached the engine is started so as to drive the winding-drum, the clutch being so adjusted as to throw either the wheel $f$ or pinion $f'$ into gear, according as the size of the tree may render necessary a quick sharp pull or a slow steady pull for uprooting it. For extracting stumps, we avail ourselves of the same principle of leverage, by using a long extracting-implement, B, which is attached at its lower end to the stump, as shown in Fig. 4, and at its upper end to the rope or chain $a$ of the winding-drum. This extracting-lever B may be variously constructed for attachment to the stump. In Fig. 4 it has a jaw, $m$, which bears upon the top of the stump, and a claw, $n$, which is caused to penetrate the latter by the pressure of the binding-chains $p$. In Fig. 5 the binding-chains are dispensed with, and the jaw $m$ has a projection, $m'$, provided with a clamping-screw, $q$, between which and the straight portion of the lever the stump is securely held. In Fig. 6 the lever is made in the form of a powerful pair of tongs, the jaws of which embrace the opposite sides of the stump.

We claim as our invention—

1. The combination of the crank-shaft G of the engine, the driving-gear E, vertical shaft H, and horizontal drum D, arranged below the boiler, all as and for the purpose set forth.

2. The combination, with the engine and appliances of a stump-extractor, of a weighted roller, F, as and for the purpose set forth.

In testimony whereof we have signed our names to this specification in the presence of two subscribing witnesses.

THOMAS SELLWOOD HUNTLEY. [L. S.]
ANDREW GILCHRIST. [L. S.]
JOSEPH ANTHONY DIXON. [L. S.]

Witnesses:
EDWARD FISHER BAMBER,
JOHN CLARK.